Aug. 8, 1939.　　　　　E. KÜRSTEINER　　　　　2,168,957
MACHINE FOR THE WINDING OF THE ELECTRICAL COILS
ON A RING-FORMED DYNAMO CORE
Filed Jan. 14, 1937　　　　　3 Sheets-Sheet 1

INVENTOR
ERNST KÜRSTEINER
BY Young, Emery & Thompson
ATTORNEYS

INVENTOR.
ERNST KÜRSTEINER
By Young, Emery & Thompson
ATTORNEYS

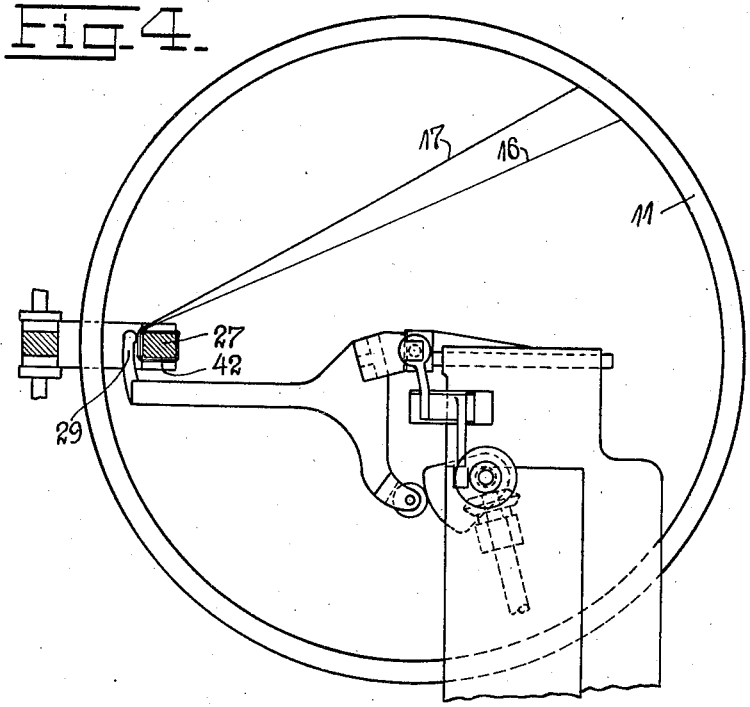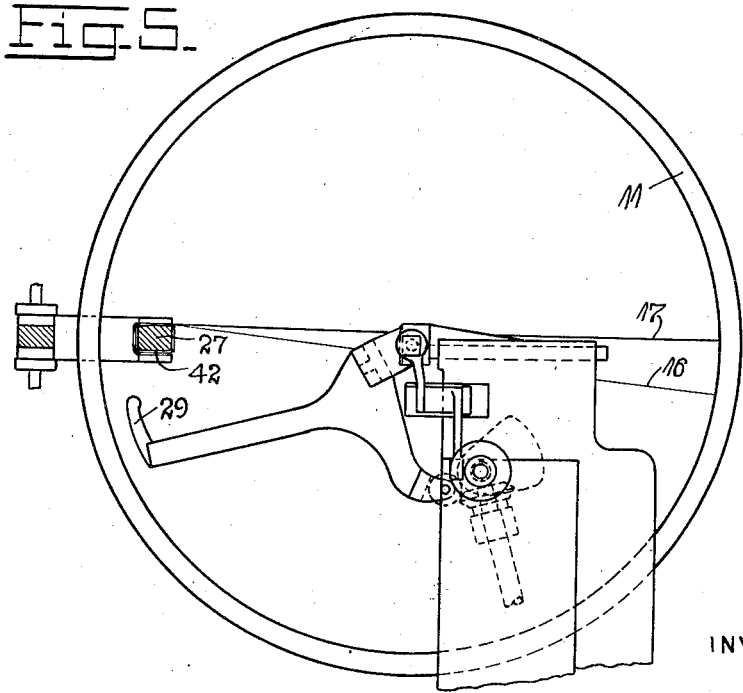

Patented Aug. 8, 1939

2,168,957

UNITED STATES PATENT OFFICE 2,168,957

MACHINE FOR THE WINDING OF THE ELECTRICAL COILS ON A RING-FORMED DYNAMO CORE

Ernst Kürsteiner, Kjelsas, near Oslo, Norway

Application January 14, 1937, Serial No. 120,607

6 Claims. (Cl. 242—5)

The present invention relates to a machine for the standard production of electrical cores for the type of dynamo machines described in United States Patent No. 2,045,734, and where all the magnetic cores are produced by winding an iron ribbon in such way that the production of the core is possible by means of machinery.

According to the present invention it is possible to produce the complete stator element including the electrical windings for such a dynamo machine by standard machinery by means of two automatic machines. The first of these automatic machines is used for winding up and locking the iron ribbon which is used for the production of the magnetic core, while the other machine, which is the object of the present invention, serves to wind the electrical coils on the said core in such a way that manual labour is reduced to a minimum.

By means of the machine according to the present invention, not only saving in the work comprised in making a dynamo machine, is obtained, but at the same time any coils produced are produced with an accuracy which is not possible by hand labour and with technical and physical properties which were not hithertofore known in dynamo machines of any type without the use of excessive work and expense.

As it will appear from the above mentioned patent the type of dynamo machine which here is concerned comprises an electrical winding of the well known Gramme type, and the winding of the conducting material, for instance the copper, is done stepwise, i. e., the copper is wound in layers in separate coils in slots in the core.

Generally speaking, for the purpose according to this invention, a winding machine is used which corresponds to machines known per se, which are used for the winding of insulating material around ringformed coils for different purposes. This type of machine comprises a wheel which can be divided and which prior to the winding action is introduced through a central hole in the ringformed piece which is to be provided with the winding. Afterwards the material, which is to be wound on the piece, is first wound onto said wheel as a magazine and is taken from this magazine wheel and wound about the piece where the winding is to be applied.

The modification of a machine of this kind and the use of such a machine according to this invention comprises, however, a number of technical problems, and the present invention thus comprises the technical means which have proved to be necesasry in order to make this manufacturing process possible.

One object of this invention is to provide a machine for winding the material, which is to be used in the electrical coils and insulating material, onto a magazine wheel in sufficient quantities to wind a number of coils, preferably all the coils on the said core. These stored materials are wound onto the core in successive layers by rotation of said wheel at the same time as the said core is rotated stepwise about its own axis after a certain number of layers of insulating and conducting materials, corresponding to the distance between two coils, has been applied.

Another object of the present invention is to solve the problem which lies in the possibility of storing the relatively stiff conducting material, such as rectangularly shaped copper ribbon, and the thin, easily breakable insulating material, for instance very thin paper, on the said wheel. According to this invention, this is made possible by winding the conducting material and the insulating material in separate coils on the magazine wheel, and to feed these materials from the said wheel through separate openings on the inside of same.

One of the greatest difficulties which arises in connection with the method as above mentioned is to provide an even tension in the conducting material to be wound on to the core. This due to the fact that the cross section of the core at that place where the copper is to be wound on the same, has a rectangular form. Furthermore, the necesasry dimensions of the magazine wheel in relation to the core diameter must be such that the cross section of the core where it is to be furnished with the coil, will be positioned quite a distance to the side of the centre of the magazine wheel. For this reason, the distance from that point of the core where the conducting material being wound on same is in contact with the core to that point where the conducting material and also the paper ribbon is fed from the magazine wheel varies to a very much greater extent than the speed with which the material is wound on to the core. Thus, that part of the material, which has been fed from the magazine wheel and which is stretched between the same and the coil under winding during the rotation of the magazine wheel, will not be held in tension during the complete revolution of the magazine wheel, but will for at least part of this revolution of the magazine wheel be without tension and even form a loop or band.

Another object of the present invention is to solve the difficulties which arise due to this action of the conducting and insulating material when fed from the magazine wheel to the coil under winding. According to this invention this difficulty is solved by providing the machine with mechanically driven means, which is kept in contact with the material which is being wound on to the core and which follows this material as the magazine wheel is rotated in such a way that the material is held in tight contact with the core respectively with the preforemost layer of the material being wound.

Such holding members and means may be given different forms and the driving mechanism for the same may be varied to a great extent.

A preferred construction according to this invention is to use four separate holding members, one for each of the rectangular sides of the cross section of the core and to make these holding members such that under mechanical force they will be made to press against and follow the conducting material just after it has been brought in position to be laid on to the core or on to the preforemost layer of conducting material and insulating ribbon.

It is preferable to construct these members in such a way that one member will not loosen its grip on the material being wound on to the core, until the next following member has commenced its work. The winding of the material is thus not dependent upon the tension in the material between the core being wound and that point of the magazine wheel where the material is fed from same, but will at any time be dependent on the pressure which the holding member is exerting on the material while it is moved over the same.

According to the invention it is preferred to arrange these holding members in such a way that they for instance under the action of cams or under the action of other suitable mechanism for each rotation of the magazine wheel are retracted from the center point of the core under winding exactly a distance corresponding to one layer of conducting and one layer of insulating material.

It is further the object of this invention to provide such means that these holding members in that period of time in which they have no work to perform are moved out of that plane wherein the material from the magazine wheel to the coil has to move under the winding operation. These holding members are thus at the same time mounted for operation in such a way that they after having completed one working operation will be retracted back from this plane, so that they will not obstruct the passage of the conducting material and the insulating material, when a new layer is to be laid on to the coil.

The object of the invention is furthermore to provide a construction for the magazine wheel adapted to be loaded with electrical conducting material and insulating material, and according to this invention this wheel may be provided with separate grooves in the periphery of same, adapted to receive a sufficient quantity of these two materials.

At the bottom of these grooves according to the invention, rollers may be provided, on which the material may run in such a way that the material as a coil may rotate freely on these rollers relatively to the said magazine wheel.

In order that the invention may be easily understood it will in the following be described with reference to the drawings which diagrammatically illustrate one embodiment of the invention.

In the drawings—

Figs. 4 and 5 are somewhat diagrammatic detail views, illustrating the operation of one of the holding members.

Figure 1:
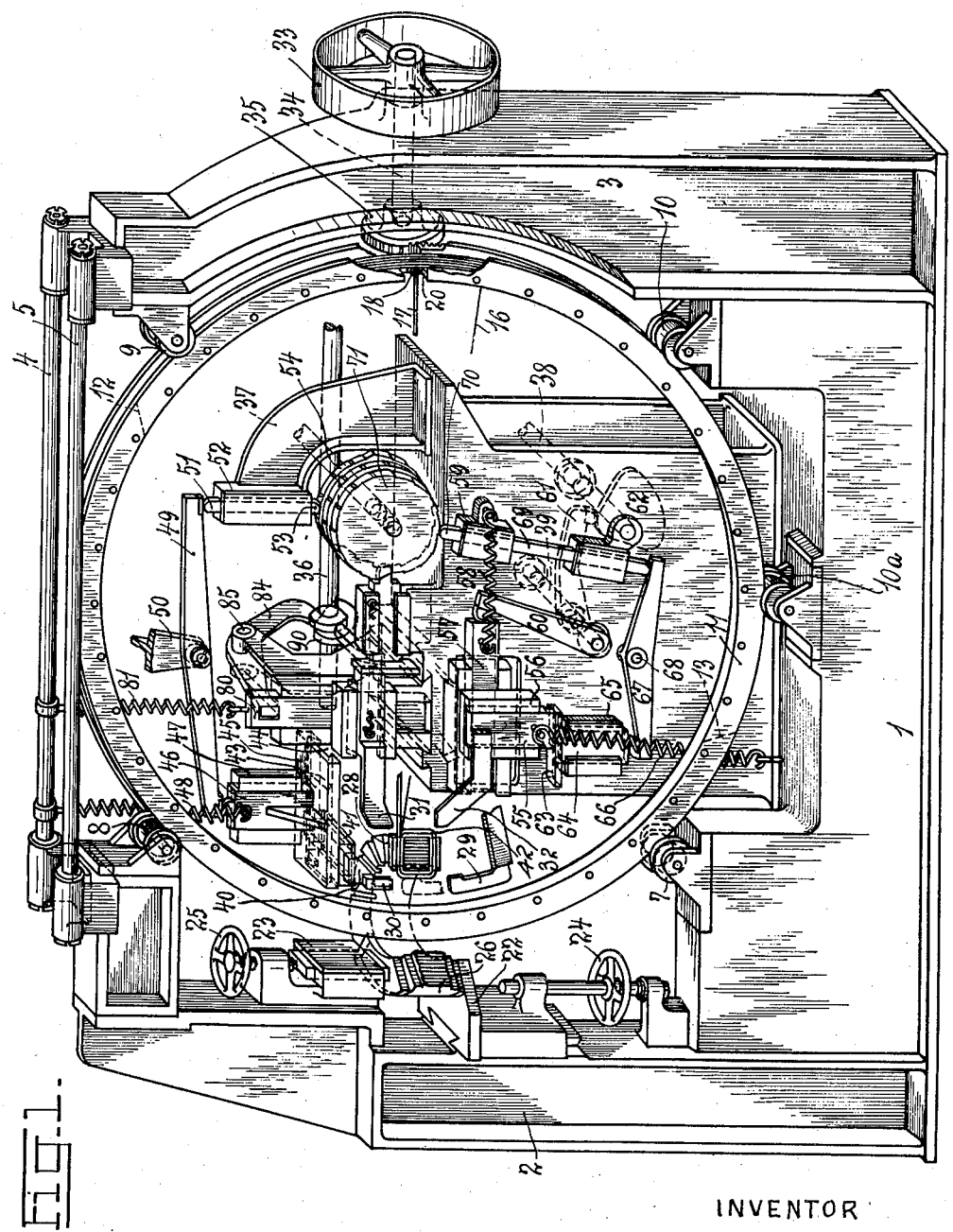
Fig. 1 is a perspective view of the machine, showing the most essential members, some of the evident driving members, however, and other evident parts having been omitted to make the drawing more clearly understood.
Figure 3:
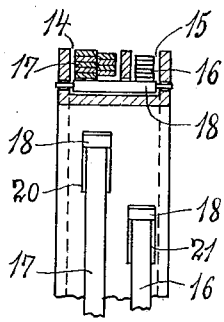
Fig. 3 is a fractional piece, partly in cross section, of the magazine wheel.

In the drawings, Fig. 1, 1 denotes the frame of the machine which has uprights 2 and 3, on the top connected with each other by means of frame members 4 and 5. In the frame, a number of rollers 7, 8, 9, 10, 10a are journalled, adapted to support the magazine wheel 11, which in a manner known per se may be divided into two parts, for instance at the lines 12 and 13, and which has grooves 14 and 15 (see Fig. 3) for storing insulating material 16, for instance of paper, and electrical conducting material 17, for instance of rectangularly shaped copper. At the bottom of these grooves rollers 18 are arranged, on which the copper ribbon and the paper ribbon may rest after they have been wound on to the wheel. The magazine wheel has furthermore apertures 20 and 21, through which the copper ribbon and the paper ribbon may be fed.

On the left side of the drawing, Fig. 1, jaws 22 and 23 which may be moved towards each other in vertical direction by means of hand wheels 24 and 25, are provided. These jaws are adapted to serve for the clamping of the core element 26 which is a part of the complete core for an electrical dynamo machine of that type which is described in the above mentioned patent. The said jaws 22, 23, are moveably held in the upright 2. In the drawing, the said dynamo core is shown as a broken away ring in order to clearly illustrate a machine according to this invention.

Figure 2:
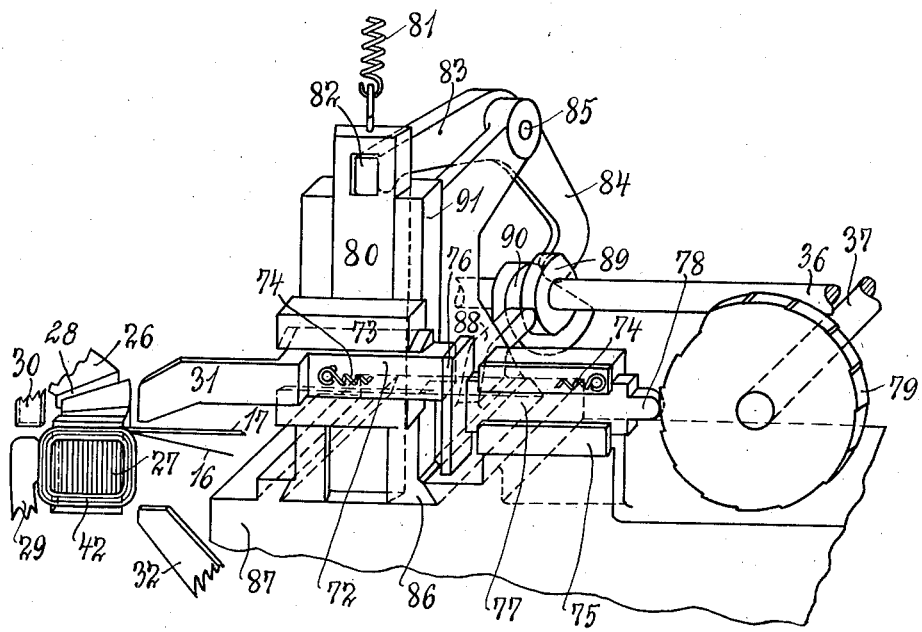
Fig. 2 shows to a larger scale details which refer to one of the holding members.

The core is manufactured by the winding of an iron ribbon 27, Fig. 2, and is provided with radially extending slots 28 in which electrically conducting coils are to be wound, which in conjunction will form the electrical winding for example on the stator of the dynamo.

The copper ribbon 17 and paper ribbon 16 are fed from the openings 20 and 21, respectively in the magazine wheel 11 and to the cores 26 as shown in Fig. 1, across the diameter of the wheel 11. For the purpose of clearness, the middle part of the ribbon is not shown in the drawings. Just around that point of the core 26 where a winding of copper and paper ribbon is to be wound, a number of holding members 29, 30, 31 and 32, Fig. 2, are arranged, which by means of suitably arranged cam discs, sliding members, straight edges and springs are adapted to follow the ribbon during the winding process, to press the ribbon into position and to hold it in position, until the next holding member commences its work. Thereafter, the holding member which has completed its work, is moved out from the coil under winding and back to its commencing position and back from the plane wherein the winding is taking place in order to be ready for its next working operation.

In the drawings the actuating members which are necessary for providing all the necessary movements for these holding members are not all shown. With reference to the holding member 30, the sliding members which are necessary for providing all the movements are shown, but the actuating members have been omitted with the exception of the one which is adapted to move the holding member in the direction out from the coil being wound a distance corresponding to the thickness of one layer of conducting material and one layer of insulating material.

With reference to the holding member 31, all the actuating members are shown in connection with the sliding members, etc., and these are all drawn to a larger scale in Fig. 2, so that the movements of this holding member can easily be studied and understood.

With reference to the holding member 32, the sliding members and the actuated members for the back and forward motion in the winding plane are shown and in addition thereto the members providing for the movements in direction outwards from the coil being wound, corresponding to one layer of conducting and one layer of insulating material.

The whole machine may be driven from a belt wheel 33 through a shaft 34 which by means of gear 35 is in connection with the wheel 11 and from which shaft the driving force through suitable gears and pinions, not shown in the drawings, is transmitted to the shafts 36, 37 and 38. The location, construction and arrangement of these gears is a matter of common sense for a man skilled in the art, and in order not to complicate the drawings too much, they have been omitted.

Referring again to the holding members and their corresponding movement mechanism, it may be seen that the holding member 30 is a part of a sliding member 40 adapted to slide horizontally in relation to the coil 42 being wound, in a block 41. The block 41 is attached to or a part of a sliding member 43 shown in dotted lines in a slot 44 in the block 45 and adapted to move in a direction parallel to the plane of the coil 42. The said block 45 is a part of or attached to a sliding member 46 which again is adapted to slide in a block 47 formed as a part of the frame of the machine or rigidly attached thereto. The slide 46 provides for a movement of the foregoing mechanism 30, 40, 41, 43, 45, 46 in the vertical direction in the plane or parallel to the plane of the coil being wound. A coil spring 48, attached to the cross member 4 of the frame, pulls this aggregate in the vertical direction upwards. A lever 49, pivoted at 50 on a part rigidly connected with the frame, is adapted to displace the parts to a given position. Lever 49 is actuated by a sliding bar 51 slidably mounted in a guide 52 which is a part of the frame of the machine. The sliding bar 51 has its lower end 53 in contact with a cam wheel 54 rotated by a shaft 37 and which at any moment will determine the position of the holding member 30 in a vertical direction with reference to the coil 42 being wound. The holding member 32 is in a similar way made a part of or attached to a sliding member 55 movable in vertical direction in a block 56 attached to a slide 57. The latter slide 57 is pulled in the horizontal direction away from the coil being wound by means of a coil spring 58 which is attached to a part 59 of the frame of the machine. At the same time an arm 60 on the shaft 39 is adapted to provide for movement of the slide 57 and thereby also the holding member 32 in a horizontal direction back and forth under the action of the arm 61 which is in contact with the cam wheel 62 mounted on the shaft 38.

In a vertical direction, the slide 55 is supported by a straight edge 63 attached to the sliding member 64 which is adapted to slide in a block 65 a part of or fixed to the frame of the machine. The sliding member 55 is spring-actuated by the spring 66 which is attached to the frame of the machine, and which tends to force the slide 55 downwards in a vertical direction. The sliding member 64 is, however, pushed upwards by means of a lever 67 pivoted at 68 in the frame of the machine and which at the opposite end is under action of a sliding member 69. The free end 70 of the sliding member 69 engages the cam wheel 71 which provides for the guiding of the holding member 32 in the vertical direction corresponding to that number of layers of conducting material and insulating material which at any time is wound on to the coil 42.

In addition to the foregoing explanation of the movements of the holding members 30, 31 and 32 and the actuated members belonging thereto, reference should be made to Fig. 2. In this figure, all the sliding members and actuating members which are necessary for providing the corresponding movements of the holding member 31 are shown on a larger scale.

The holding member 31 is attached to a slide 72 slidably mounted in a block 73 for movement in a plane parallel to the winding plane. A spring 74, partly broken away on the figure, urges the slide 72 in the direction towards the right in the drawing. The spring 74 on the right side is attached to the block 75 which is a part of the machine frame. The rear end of the sliding member 72 rests against a straight-edge 76 which is rigidly connected to a sliding member 77, adapted to slide in a block 75, also in the horizontal direction and in a plane parallel to the plane of winding. The slide 77 has a projecting end 78 which rests against a cam wheel 79 rotated about the axis of the shaft 37. The shaft 37 moves with a speed of rotation such that for each rotation of the wheel 11 the projecting end 78 will move from contact with one of the steps in the cam wheel 79 to the next. The holding member 31 will thus, for each rotation of the wheel 11, move in a horiozntal direction backwards from the coil 42 being wound, a distance corresponding to one step of cam 79 which is equal to the thickness of one layer of conducting and one layer of insulating material. The left end of the holding member 31 will thus at any time be positioned exactly in the same plane as the outer edge of that layer of conducting material and paper being laid on the coil 42.

The block 73, in which the sliding member 72 is mounted for sliding action in the horizontal direction, is attached to a slide 80 which by means of a spring 81 attached to the frame member 4 tends to pull the block upwards in a vertical direction in a plane parallel to the winding plane of the coil. The sliding member 80 is guided in the block 91 and has at its upper end an aperture 82, in which one end 83 of an arm 84 extends. This arm 84 is pivoted at 85 in the frame of the machine. The other end of arm 84 is in contact with a cam wheel 90, attached to the shaft 36 and moved with a speed of rotation corresponding to the speed of rotation of the wheel 11. The cam wheel 90 is so formed that the arm 84 through its part 83, the sliding member 80, the block 73 and the sliding member 72 will act to move the holding member 31 downwards in contact with the ribbon 17, while the latter is being wound on to the coil 42. The block 91 is fixed to the sliding member 86 which is adapted to slide in the horizontal direction normal to the winding plane in a block 87 which is a part of the machine frame. At the rear end of the sliding member 86 a projecting arm 88 is provided, which rests against a cam wheel 89. A spring (not shown in the drawing) is provided to push the extending arm 88 in to secure contact with the cam wheel 89. The cam wheel 89 which is mounted on the shaft 36 moves around with the same speed of rotation as the wheel 11 and acts immediately after the cam wheel 90 has moved the holding member 31 downwards along the band 17 being wound and the next following holding member 32 has commenced its work, holding the ribbon under the further winding action, to retract the holding member 31 in such a way that it will be moved out of the winding plane and not obstruct the passage of the ribbons 16 and 17 for the next layer of the coil.

The machine as above described operates in the following manner:

The insulating ribbon 16 and the electrical conducting ribbon 17 are pulled out from the magazine wheel 11 to the slot in the core 26 which is to be provided with a winding. The machine is started and the holding member 30 will move over and take hold of the ribbon and maintain this in contact with the core. The machine continues to move, and the holding member 31 will take hold after the holding member 30 and will press the ribbon with good contact against the core, whereafter the wheel 11 will continue to rotate and carry the ribbons 16 and 17 along. The holding member 32 will now come into position and will follow the ribbon upwards along the inner vertical side of the core 26. In Fig. 1, the holding member 29 is shown in dotted lines in that position which the different holding members assume just before the holding member 30 commences its work in following the ribbon 17 along the upper horizontal side of the coil. For each rotation of the wheel 11, the holding members will be pulled back a distance corresponding to one thickness of the material which is being wound on to the coil by means of the cam wheels 54, 71 and 79 and one cam wheel for the holding member 29, not shown in the drawings. The winding operation will continue until the correct number of layers has been placed on to the coil, whereafter the core 26 by means of handwheels 24 and 25 is loosened and is rotated about its own axis a distance corresponding to the correct distance between two coils to be wound. The ribbons 16 and 17 are bent in the proper way, so that it is possible without cutting the same to continue the winding of the next coil.

I claim:

1. A machine for winding electrical coils on ring-shaped magnetic cores of rectangular cross-section, comprising a frame, means on said frame for clamping a magnetic element of ring shape with a centre hole, a wheel of substantially larger diameter than the said core mounted for rotation in the said frame and adapted to be opened and passed through the said hole in the said core, means on the circumference of the said wheel adapted to receive a quantity of electric conducting and insulating material, said wheel having openings in the circumference for the passage of said conducting and said insulating material from the said wheel towards the part of the said core which is on the inside of the said wheel, and means on the machine adapted to follow said conducting material around said core and to remain in contact with the same and force it into position on the core, as the said wheel is being rotated.

2. A machine for winding electrical coils on ring-shaped magnetic cores of rectangular cross-section, comprising a frame, means on said frame for clamping a magnetic element of ring shape with a centre hole, a wheel of substantially larger diameter than the said core mounted for rotation in the said frame and adapted to be opened and passed through the said hole in the said core, means on the circumference of the said wheel adapted to receive a quantity of electric conducting and insulating material, said wheel having openings in the circumference for the passage of said conducting and said insulating material from the said wheel towards the part of the said core which is on the inside of the said wheel, and means on the machine adapted to follow said conducting material around said core and to remain in contact with the same and force it into position on the core as the said wheel is being rotated, said means comprising individual units, each adapted to engage one of the rectangular sides of the core, on which the coil is being wound.

3. A machine for winding electrical coils on ring-shaped magnetic cores of rectangular cross-section, comprising a frame, means on said frame for clamping a magnetic element of ring shape with a centre hole, a wheel of substantially larger diameter than the said core mounted for rotation in the said frame and adapted to be opened and passed through the said hole in the said core, means on the circumference of the said wheel adapted to receive a quantity of electric conducting, and insulating material, said wheel having openings in the circumference for the passage of said conducting and said insulating material from the said wheel towards the part of the said core which is on the inside of the said wheel, and means on the machine adapted to remain in contact with the said conducting material and force it into position on the core as the said wheel is being rotated, said means comprising individual units, each adapted to engage one of the rectangular sides of the core, on which the coil is being wound, and being timed in such a way in relation to each other that one holding unit will not be disengaged from the conducting material before the next following unit has commenced its work in contact with the said conductor.

4. A machine for winding electrical coils on ring-shaped magnetic cores of rectangular cross-section, comprising a frame, means on said frame for clamping a magnetic element of ring shape with a centre hole, a wheel of substantially larger diameter than the said core mounted for rotation in the said frame and adapted to be opened and passed through the said hole in the said core, means on the circumference of the said wheel adapted to receive a quantity of electric conducting and insulating material, said wheel having openings in the circumference for the passage of said conducting and said insulating material from the said wheel towards the part of the said core which is on the inside of the said wheel, and means on the machine adapted to remain in contact with the said conducting material and force it into position on the core as the said wheel is being rotated, said means comprising individual units, each adapted to engage one of the rectangular sides of the core, on which the coil is being wound, and being mounted on sliding members actuated by swinging arms which are in operative connection with the driving means for the machine, in such a way that the holding member or unit, when one working operation is completed, stepwise will be moved in direction out from the coil being wound a distance corresponding to one layer of conducting and insulating material.

5. A machine for winding electrical coils on ring-shaped magnetic cores of rectangular cross-section, comprising a frame, means on said frame for clamping a magnetic element of ring shape with a centre hole, a wheel of substantially larger diameter than the said core mounted for rotation in the said frame and adapted to be opened and passed through the said hole in the said core, means on the circumference of the said wheel, adapted to receive a quantity of electric conducting and insulating material, said wheel having openings in the circumference for the passage of said conducting and said insulating material from the said wheel towards the part of the said core which is on the inside of the said wheel, and means on the machine adapted to remain in contact with the said conducting material and force it into position on the core, as the said wheel is being rotated, said means comprising individual units, each adapted to engage one of the rectangular sides of the core, on which the coil is being wound, and being mounted on sliding members actuated by swinging arms which are in operative connection with the driving means for the machine in such a way that the holding member or unit, when one working operation is completed will be moved out of the plane of the coil being wound, and remain there until the conducting and insulating material by the rotation of the wheel has been laid on the coil in a new layer.

6. A machine for winding electrical coils on ring-shaped magnetic cores, comprising a frame, means on said frame for clamping a magnetic element of ring shape with a centre hole, a wheel of substantially larger diameter than the said core mounted for rotation in the said frame and adapted to be opened and passed through the said hole in the said core, means on the circumference of the said wheel adapted to receive a quantity of electric conducting and insulating material, said wheel having openings in the circumference for the passage of said conducting and said insulating material from the said wheel towards the part of the said core which is on the inside of the said wheel, and means on the machine adapted to remain in contact with the said conducting material and force it into position on the core, as the said wheel is being rotated, said means comprising working members, adapted to slide over the conducting material, pressing it into position on the coil, to move away from the coil in the plane of same a distance equal to one layer of conducting material and insulating material, and to move away from the plane of the coil, so that it will not obstruct the passage of one new layer of material on to the coil.

ERNST KÜRSTEINER.